March 23, 1926. 1,577,656
A. C. PARKER
AUTOMATIC BURNING-OFF MACHINE
Original Filed Oct. 17, 1924 10 Sheets-Sheet 1

Inventor
Alvah C. Parker
By Owen, Owen & Crampton
Attorneys

March 23, 1926.  
A. C. PARKER  
1,577,656  
AUTOMATIC BURNING-OFF MACHINE  
Original Filed Oct. 17, 1924   10 Sheets-Sheet 3

Inventor  
Alvah C. Parker  
By Owen, Owen & Crampton  
Attorneys

March 23, 1926. 1,577,656
A. C. PARKER
AUTOMATIC BURNING-OFF MACHINE
Original Filed Oct. 17, 1924 10 Sheets-Sheet 6

Inventor
Alvah C. Parker
By Owen, Owen & Crampton
Attorneys

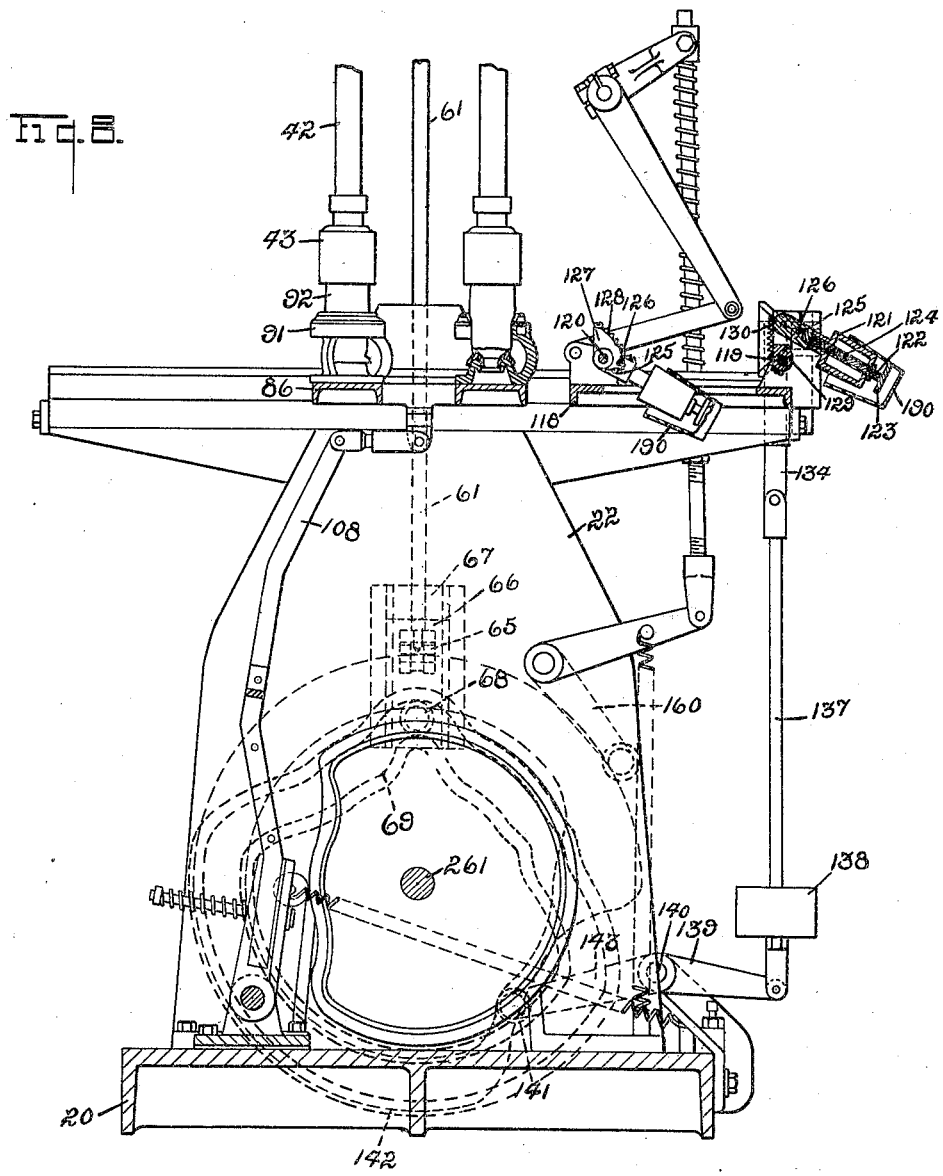

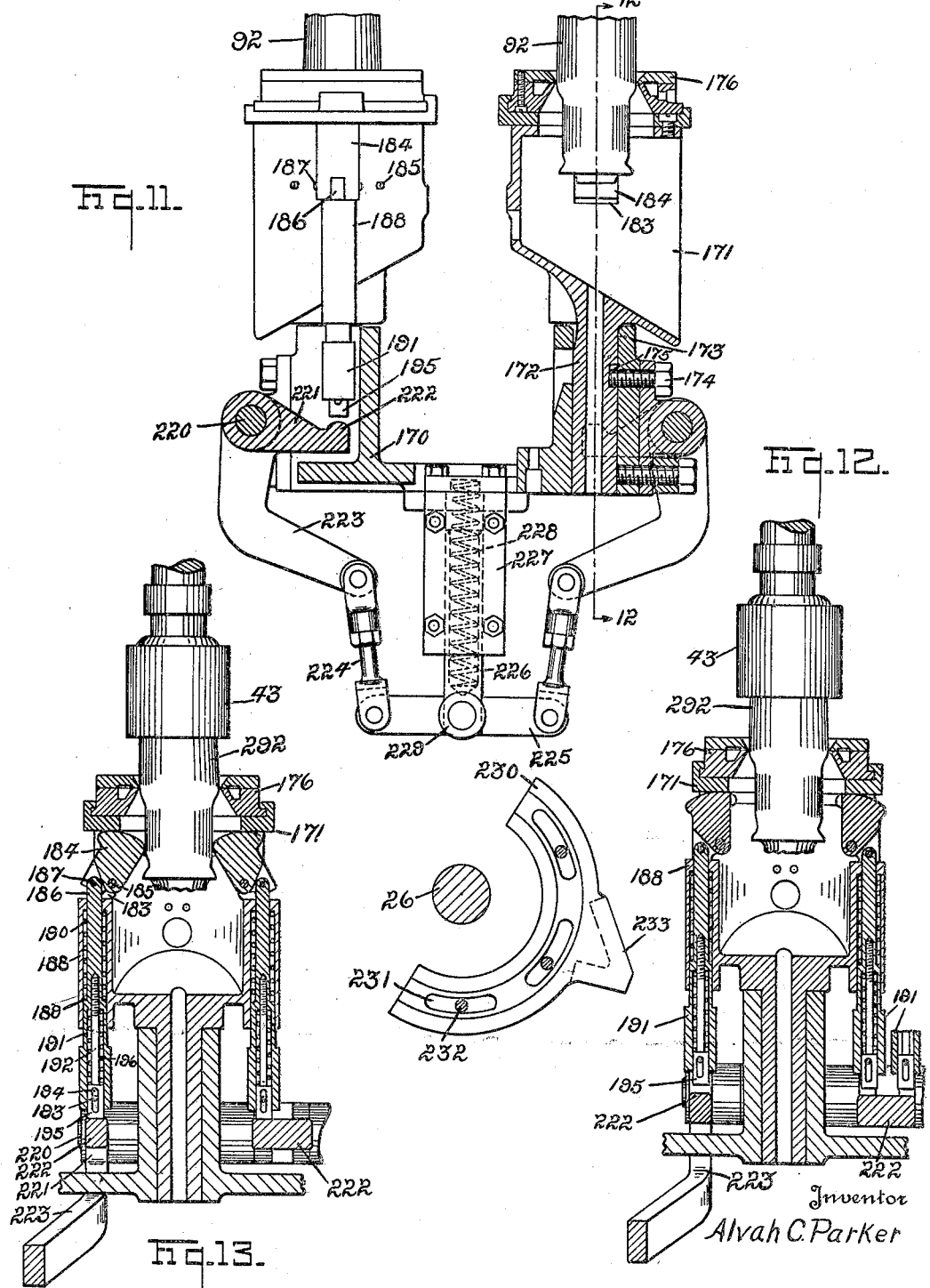

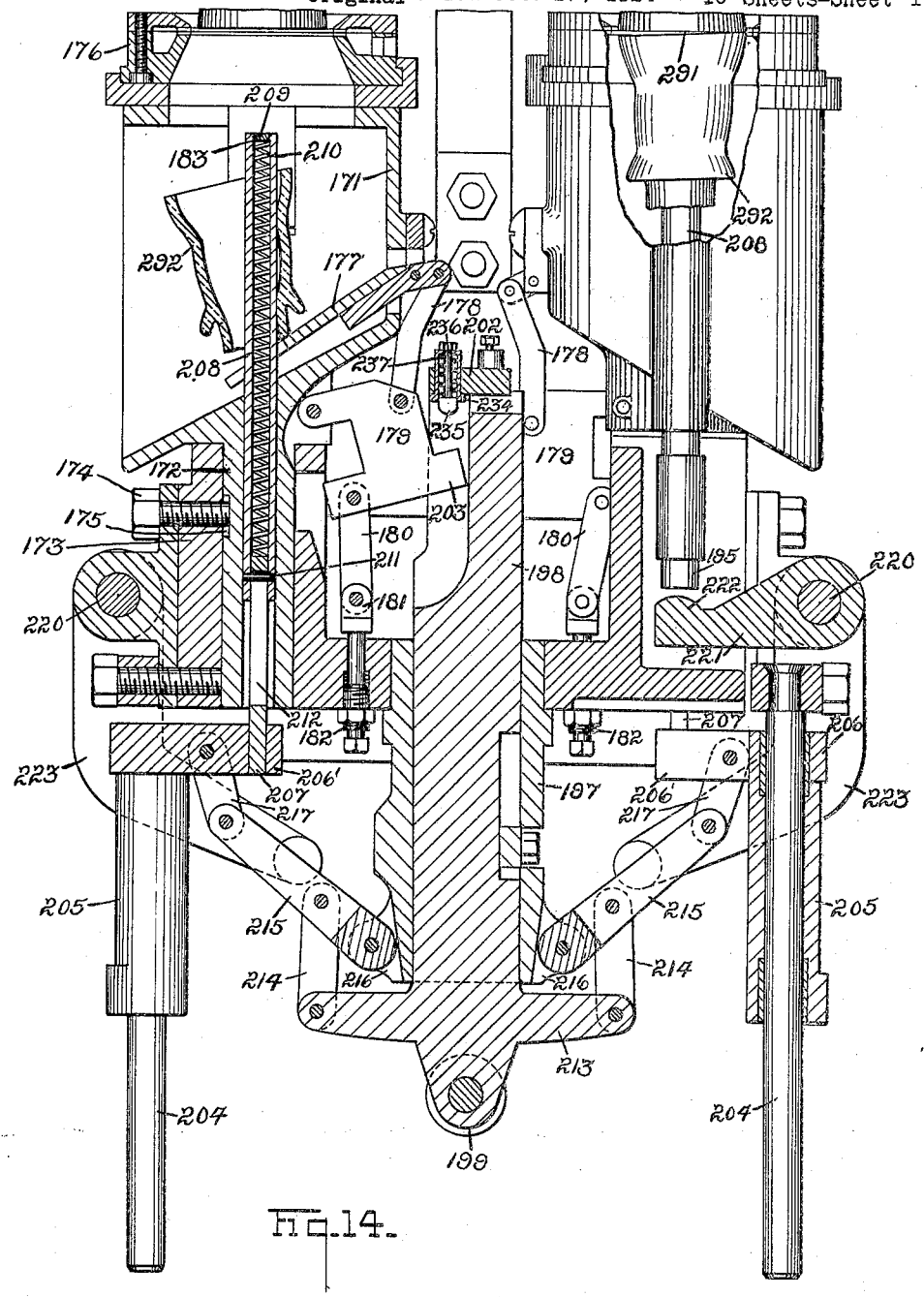

Patented Mar. 23, 1926.

1,577,656

UNITED STATES PATENT OFFICE.

ALVAH C. PARKER, OF TOLEDO, OHIO, ASSIGNOR TO THE LIBBEY GLASS MANUFACTURING COMPANY, A CORPORATION OF OHIO.

AUTOMATIC BURNING-OFF MACHINE.

Application filed October 17, 1924, Serial No. 744,135. Renewed December 23, 1925.

To all whom it may concern:

Be it known that I, ALVAH C. PARKER, a citizen of the United States, and a resident of Toledo, in the county of Lucas and State of Ohio, have made an invention appertaining to an Automatic Burning-Off Machine, which invention is fully set forth in the following specification.

My invention relates to an automatic burning-off device and has for its general object to provide a device which will automatically take articles of glassware from holders provided therefor, burn off the moil from the articles and deliver the articles from the apparatus.

My device includes charging tables having holders in which an operator may place glass articles, means for reciprocating the receiving tables between receiving position and positions in line with chucks, operative means whereby the chucks will take the articles from the charging tables in alignment therewith, carry the articles to burners which will burn-off the moil and deliver the articles to discharging tables which are reciprocated between receiving position in alignment with the chucks and discharging position.

Other objects and features of the invention will appear as the description proceeds.

Figure 1:
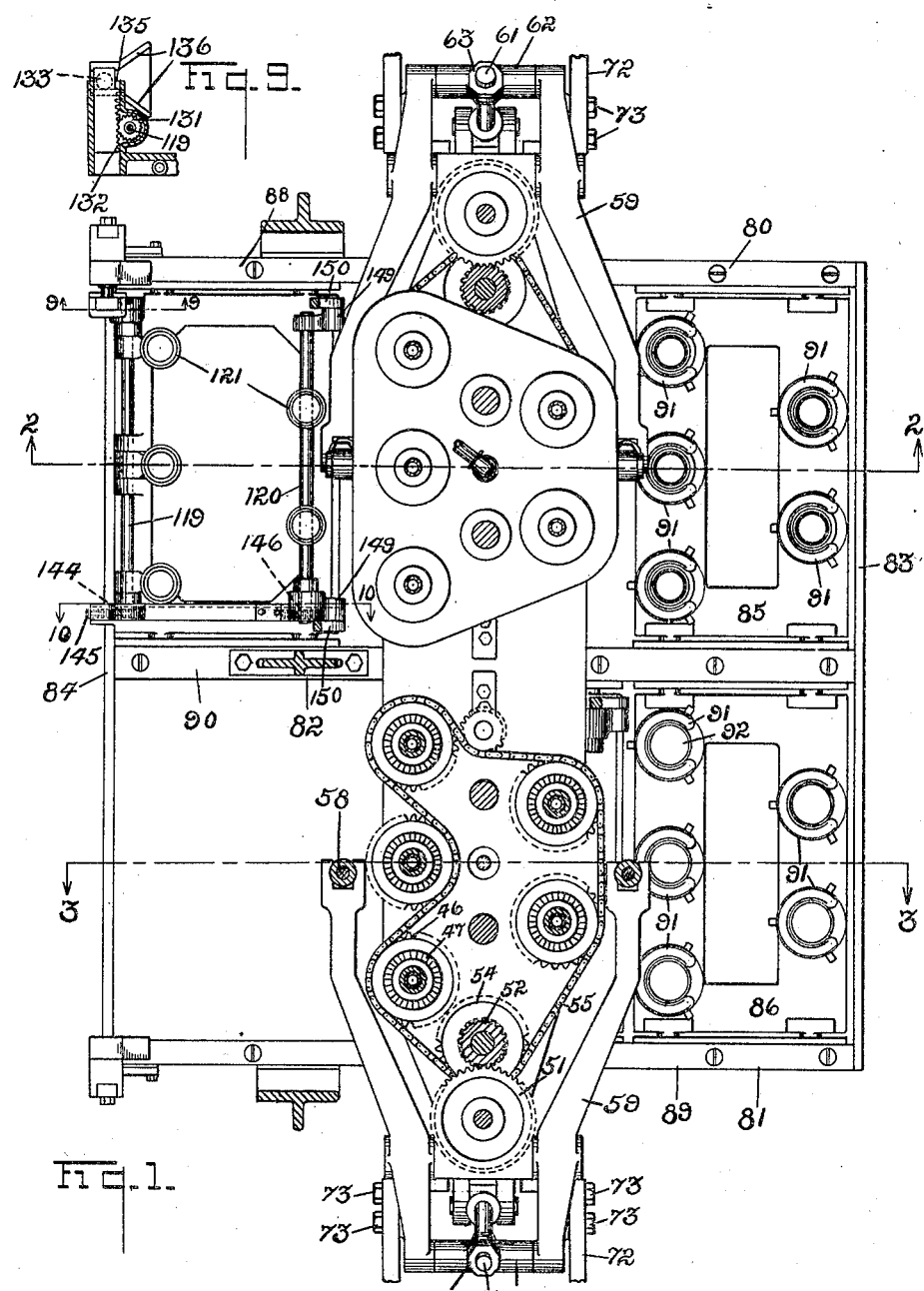
Figure 2:
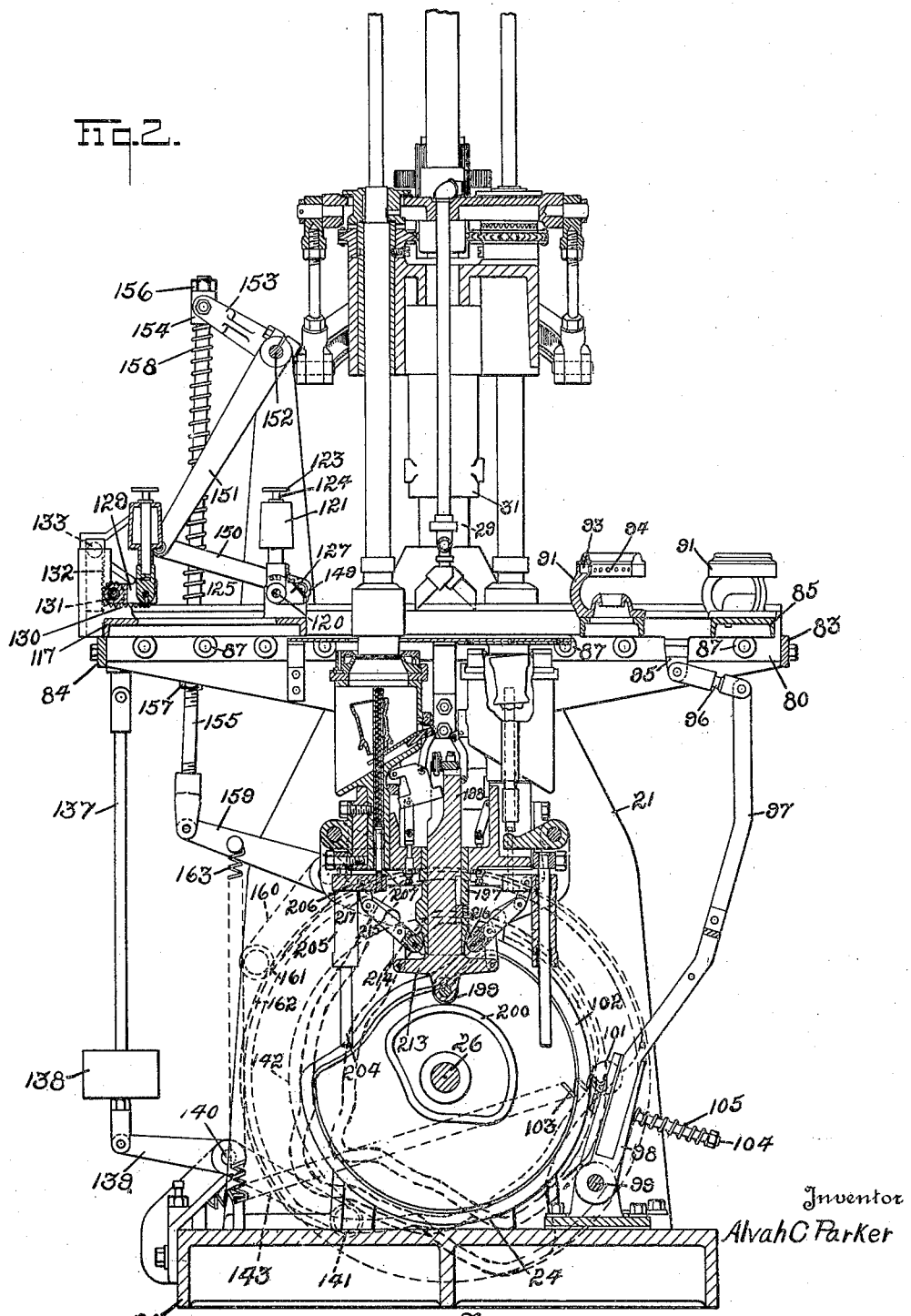
Figure 3:
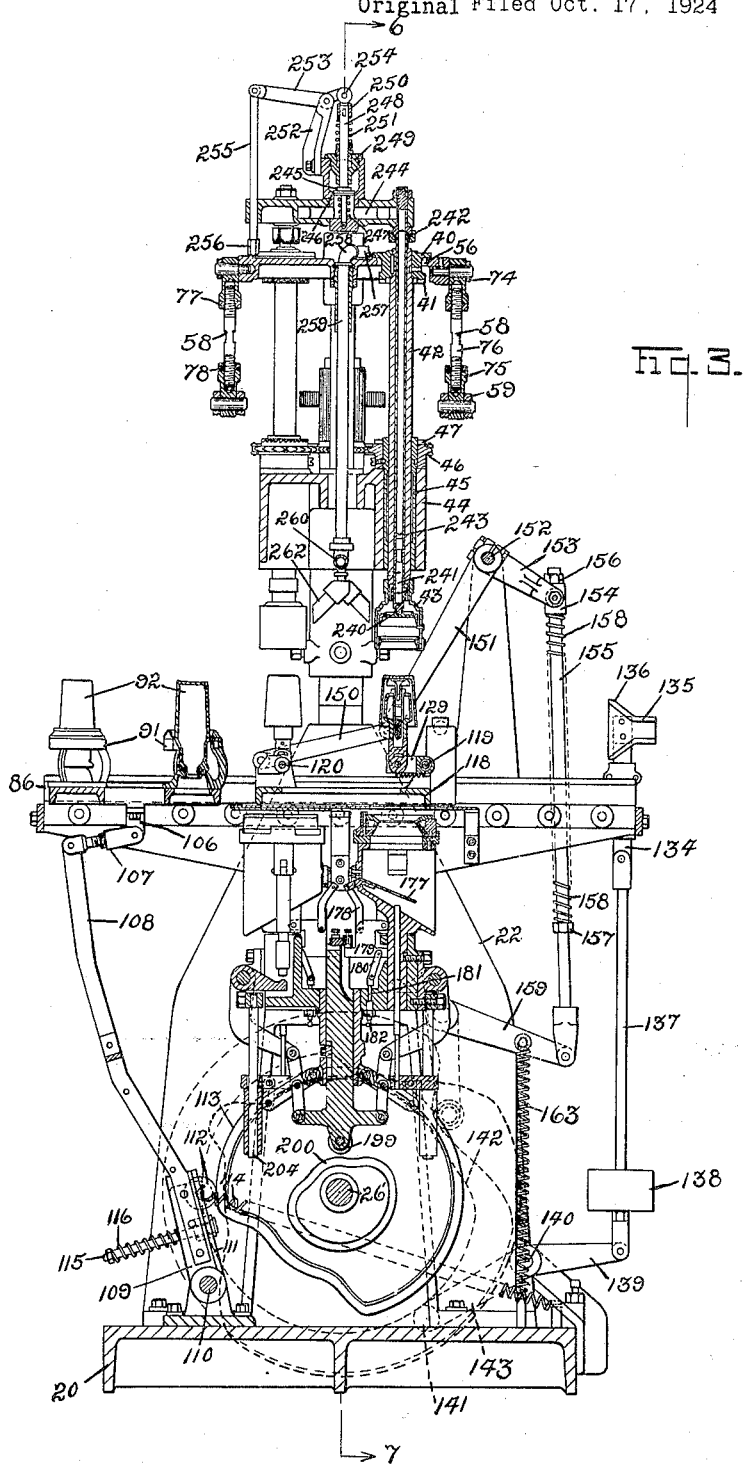
Figure 4:
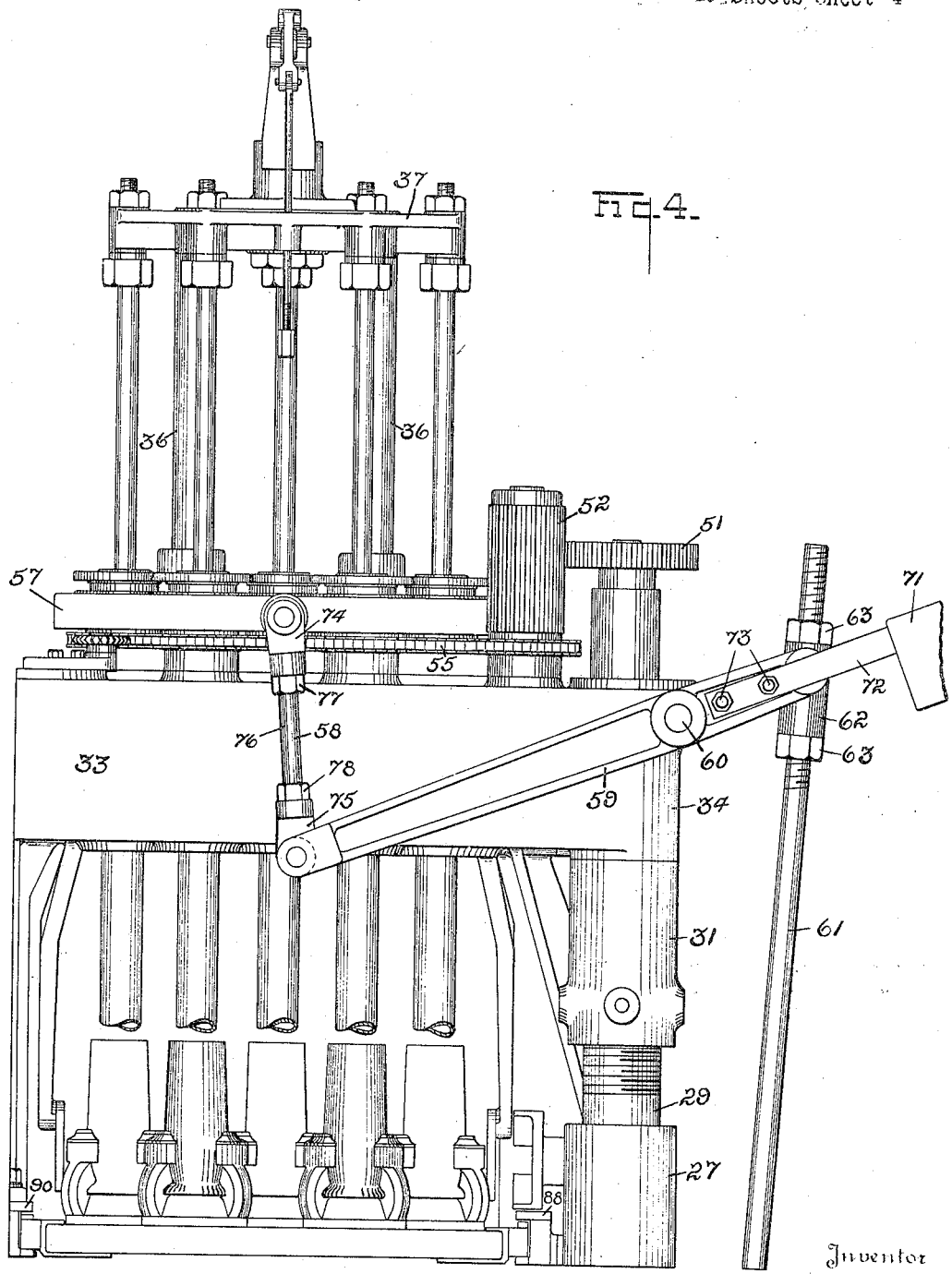
Figure 5:
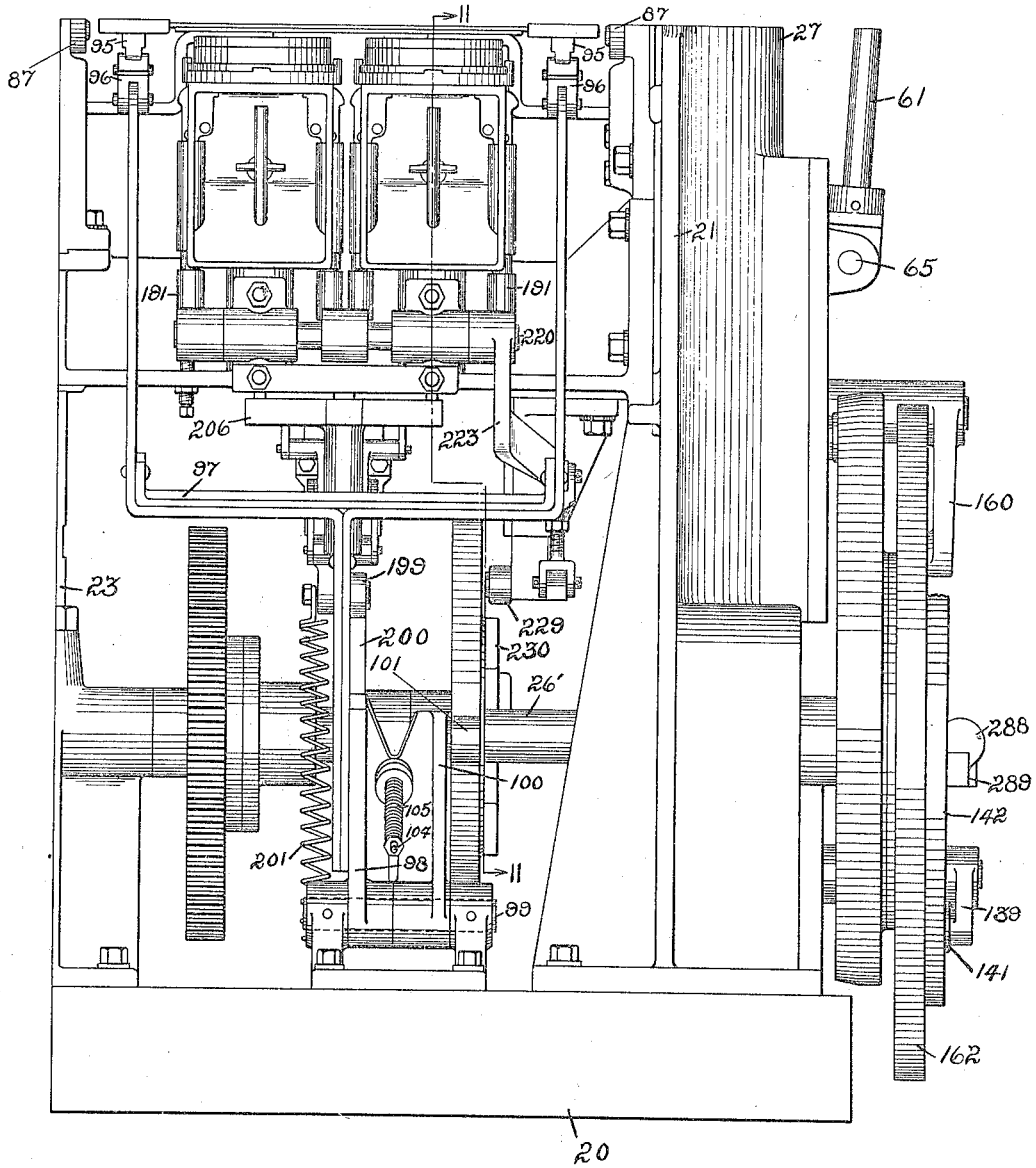
Figure 6:
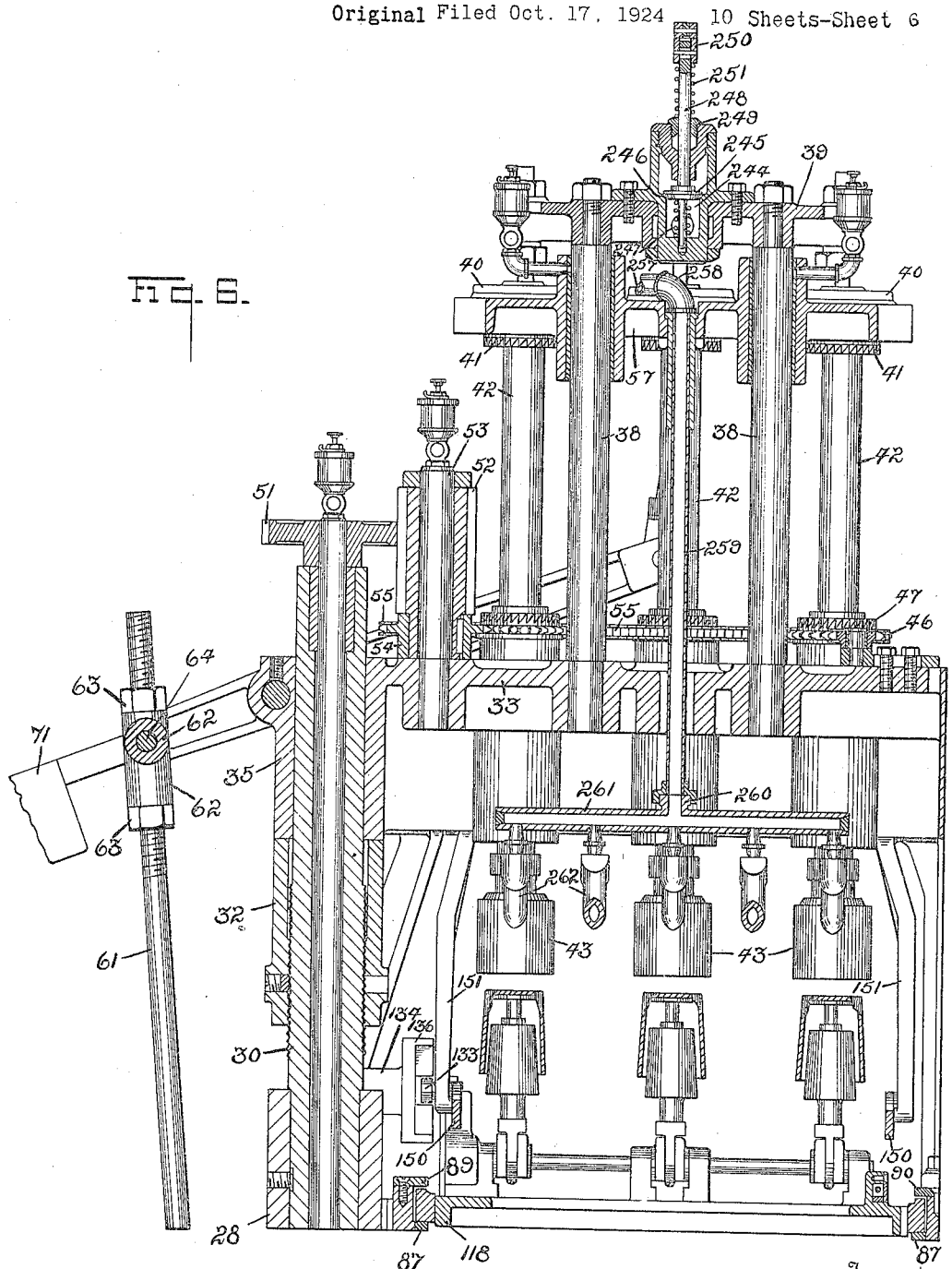
Figure 7:
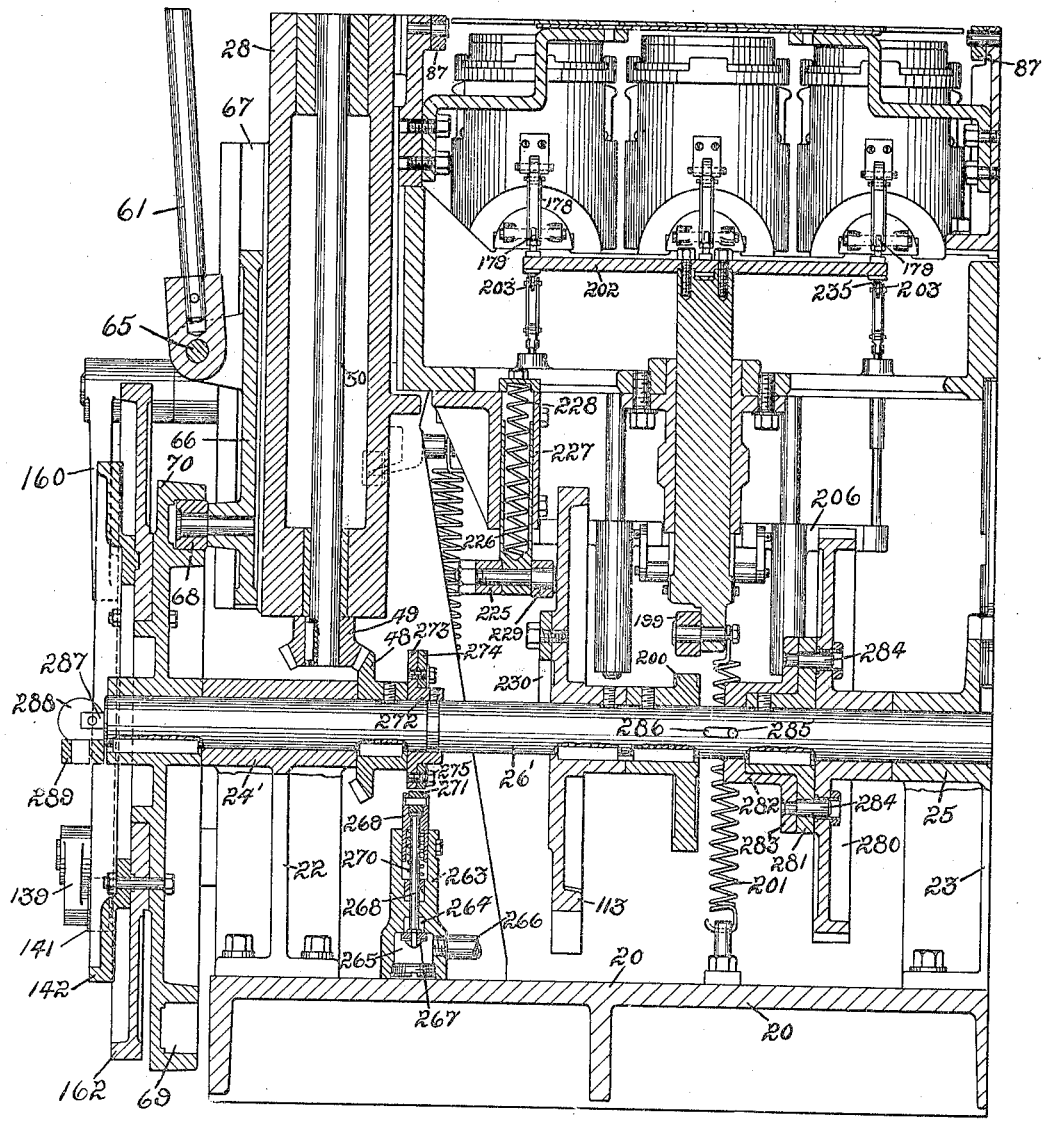

Referring to the accompanying drawings, Figure 1 is a plan view, partly in section, of apparatus embodying my invention; Fig. 2 is a vertical section on the line 2—2 of Fig. 1; Fig. 3 is a a vertical section on the line 3—3 of Fig. 1; Fig. 4 is a side elevation of the upper portion of the end of the apparatus through which the line 2—2 is drawn in Fig. 1; Fig. 5 is a similar side elevation of the lower part of the same end of the apparatus; Figs. 6 and 7 are sections on the line 6—7 of Fig. 3, Fig. 6 being on the upper portion of said line and Fig. 7 on the lower portion of said line; Fig. 8 is a view similar to Fig. 3 showing portions of the apparatus in another position; Fig. 9 is a detail section on the line 9—9 of Fig. 1; Fig. 10 is a detail section on the line 10—10 of Fig. 1; Fig. 11 is an enlarged detail section on the line 11—11 of Fig. 5; Fig. 12 is a section on the line 12—12 of Fig. 11; Fig. 13 is a section similar to Fig. 12 showing the parts in a different position; Fig. 14 is an enlarged detail of a portion of Fig. 2.

The apparatus is supported upon a base portion 20 from which end frames 21 and 22 arise. Between the end frames there is a central support 23. A bearing 24 is mounted upon base plate 20 between legs of end frame 21, while a similar bearing 24' is similarly mounted between legs of end frame 22. A central bearing 25 is mounted on base plate 20 in alignment with and midway between bearings 24 and 24'. A drive shaft 26 is mounted in bearings 24 and 25, and a similar drive shaft 26' is mounted in bearings 24' and 25. The end frame 21 has a vertical bearing portion 27 and the frame 22 has a similar bearing portion 28. Sleeves 29 and 30 are fixed in the upper ends of these bearings. Collars 31 and 32 are adjustably supported upon the sleeves 29 and 30, respectively.

A spindle-bearing plate 33 has perforated lugs 34 and 35, which surround the sleeves 29 and 30 and rest upon the collars 31 and 32. Columns 36, 36 support a valve plate 37 from the end of the spindle bearing plate shown in Fig. 4, while columns 38, 38 support a similar valve plate 39 from the end of the spindle bearing plate, shown in Fig. 6. Inasmuch as the apparatus supported at these two ends is identical in structure, the same reference numerals will be applied to the corresponding operative parts in the two ends.

There are five chuck-carrying spindles arranged in each end of the machine. These spindles are constructed alike, so that a description of one applies to all. The apparatus of each chuck includes a pinion 40 having teeth 41 on its lower side. The pinion is mounted on the upper end of a spindle sleeve 42, which carries a chuck 43 at its lower end. Plate 33 is provided with a bearing 44 for each spindle. A bearing sleeve 45 fits within each bearing 44. The sleeve 45 has secured to its upper end a sprocket wheel 46. The sprocket wheel has teeth 47 on its upper side adapted to mesh with the teeth 41 of pinion 40 under conditions which will be later described.

A bevel gear 48 is secured on each drive shaft 26, 26' inside of the end frame and meshes with a bevel gear 49 on the lower end of a vertical shaft 50 mounted in suitable bearings in the bearing portions 27 and 28. To the upper end of shaft 50 there is secured a gear 51 meshing with an elongated gear 52 mounted upon a stub shaft 53 projecting upward from the spindle bearing plate. A sprocket wheel 54 is attached to the lower end of the gear 52 and drives a chain 55, which in turn drives the sprocket wheels 46. The spindle sleeves 42 are reciprocable and rotatable within the bearing sleeves, but rotate therewith when teeth 41 on pinions 40 are in mesh with teeth 47 on sprocket wheels 46.

The five pinions 40, at each end of the machine, are mounted in suitable sockets 56 in plates 57. Each plate 57 is connected by links 58, 58 on its two sides to levers 59 fulcrumed at 60 upon pivots suitably supported in the lugs 34 and 35 of spindle bearing plate 33.

The upper end of a link 61 passes through a T-head 62 and is secured in adjusted position in the T-head by means of nuts 63, 63. The ends of the horizontal member of the T-head have pivots 64, 64 which connect them to the projecting ends of the levers 59. The link 61 is connected by means of a pivot 65 to a slide 66 vertically reciprocable in a guideway 67 on the end frame. The slide 66 has a cam roller 68 operating in a cam groove 69 in a cam wheel 70 mounted on the drive shaft. Counter weights 71 are mounted on arms 72 fastened by means of bolts 73 to the ends of the levers 59. I prefer to connect the link 58 to the plate 57 and lever 59 adjustably, as by having suitable blocks 74, 75 pivoted upon plate 57 and lever 59, respectively, and screwing a central rod 76 into these blocks, the blocks being secured in adjusted position on the central rod 76 by means of lock nuts 77 and 78.

A frame for supporting charging and discharging carriers is suitably mounted upon the frame. This carrier support is constructed, as shown, of end rails 80, 81 and a middle rail 82 connected to side rails 83 and 84. A charging carrier or table 85 is mounted upon end rail 80 and middle rail 82 to slide to and from side rail 83, and a similar charging carrier or table 86 is mounted between end rail 81 and middle rail 82 to slide to and from side rail 83. The end rails and middle rail carry rollers 87 upon which the charging and discharging carriers may move. A retaining plate 88 is secured to the top of end rail 80, a similar retaining plate 89 is secured to the top of end rail 81, and a broad retaining plate 90 is secured to the top of middle rail 82. These plates overlie the rollers 87 and so guideways for the carriers are formed between the rollers and the respective retaining plates.

Upon each charging carrier there are charging holders 91, one for each spindle with which the carrier is to co-operate, in this instance there being five holders on each carrier. These holders are suitably constructed to hold the articles to be treated, such as blown tumblers 92. I prefer to make the holders hollow, as shown at 93, for receiving fuel from any suitable source, and perforations 94 allow the escape of such fuel to form heating jets which surround the article in the holder.

The table 85 is shown with downwardly directed lugs 95 connected by links 96 to a forked lever 97. The lever 97 is bolted to a lever carrier 98, pivoted at 99 to a suitable bracket on the base plate. An arm 100 is also pivoted at 99 and carries a cam roller 101 at its upper end adapted to be actuated by a cam 102 mounted on shaft 26. A spring 103, connected to the arm 100 and the base plate, maintains the cam roller in contact with the cam. A pin 104 passes through the arm 100 and the lever carrier 98, and a spring 105 surrounding the pin 104 normally maintains the arm and lever carrier in contact with each other.

Similar mechanism is connected to table 86, there being downwardly projecting lugs 106 connected by links 107 to a forked lever 108 bolted to a lever carrier 109 pivoted at 110 to the base 20. An arm 111 is also pivoted at 110 and carries a cam roller 112 held in contact with a cam 113 by means of a spring 114. A rod 115 and spring 116 yieldingly hold the lever carrier and arm in contact with each other.

A discharging carrier 117 is mounted between end rail 80 and middle rail 82 to move towards and from the side rail 84, and discharging carrier 118 is similarly mounted between end rail 81 and middle rail 82 to slide towards and from side rail 84. These carriers are of identical construction so that the description of one applies to both.

Upon each discharging carrier there are rods 119 and 120, the rod 119 carrying three discharging holders 121 and the rod 120 carrying two discharging holders. These holders are of identical construction so that the description of one applies to all. Each holder has a central pin 122 with an end disc 123 normally projected outward by means of a spring 124.

The stem of the holder is provided with an arcuate slot 125 through which there projects a pin 126. The pins 126 for the holders carried by rod 120 are affixed in members 127 fastened directly to the rod 120. A spring 128 connected to the holder and to the lug 127 normally tends to raise the holder from the position shown in Fig. 8, and holds it upright in the position shown in Fig. 3. The pins 126 for the holders mounted on rod 119 are fixed in arms 129 mounted on said rods, and a spring 130 attached to the holder and arm corresponds in function with the spring 128, as previously described.

To the outer end of the rod 119 there is fixed a pinion 131, which meshes with a vertical slide rack 132 having an outwardly projecting roller 133. A suitably mounted slide 134 carries a member at its upper end having a groove 135 adapted to receive the roller 133. The end of the groove towards the middle of the apparatus is flared, as shown at 136. The slide 134 is pivoted to a downwardly extending link 137, which carries a weight 138 near its lower end. The lower end of the link 137 is pivoted to an arm 139 on a rock shaft 140 mounted in a suitable bracket on the base plate 20. A cam roller 141, adapted to contact a cam 142, is mounted in another arm 143 on rock shaft 140. The other end of rod 119 carries a pinion 144. A rod 145 is mounted across the end of the slide and carries at one end a rack 145' in mesh with pinion 144, and at the other end a rack 145'' in mesh with a pinion 146 on the end of rod 120, so that the rods are forced to turn in unison. A spring 145''' surrounds rod 145 and normally holds it in a position which maintains holders 121 upright.

Lugs 149 extend upward from the discharging carrier and are connected by links 150 to rock arms 151 mounted on a rock shaft 152. Another arm 153 extending from the same rock shaft is pivoted to a collar 154 sliding on a rod 155. The upward movement of the collar upon the rod is limited by a nut 156. A lower nut 157 upon the rod 155 forms an abutment between which and the collar there is mounted a spring 158. Rod 155 is pivoted at its lower end to an arm 159 of a bell crank lever. The other arm 160 of the lever carries a cam roller 161 in contact with a cam 162 mounted upon the drive shaft. A spring 163 connected to arm 159 and base plate 20 normally holds roller 161 in contact with cam 162.

Suitably mounted upon the end frames is a burner guide frame 170. This guide frame supports apparatus suitably guiding the operation of the devices immediately connected with the burners. There are five of these burners and their connected devices at each end of the machine, and these are identical, so that the description of one applies to all.

A burner carrier 171 has a downwardly projecting sleeve 172 mounted in a bearing 173 in the burner guide frame. A screw 174 passing through the bearing has its end in a slot 175 in the sleeve 172 and prevents the turning of the sleeve in the bearing while permitting longitudinal movement. Each burner carrier supports an annular burner 176 at its upper end.

Directly beneath the burner there is mounted a trip pedal 177. The trip pedal is pivoted in a carrier, and its rear end is connected by links 178, 178 to a bell crank lever 179. One arm of the bell crank lever 179 is pivoted to the carrier, and the other arm is connected by links 180, 180 to a vertical slide 181 resting upon an adjustable screw stop 182.

The carrier 171 has slots 183, 183 in its two sides. Working in these slots are jaws 184, 184 pivoted at 185, 185. Vertical slides 186, 186 are pivoted to the jaws at 187, 187. There must be some slight play at pivots 185 or 187 so as to allow the relative vertical movement of these pivots. Each slide 186 is mounted in a slide way 188 in the carrier and has a shoulder 189 within the slide way. A spring 190 between the slide and slide way and bearing against the shoulder 189 normally presses the slide downward. The lower end of each slide 186 has a bore 191 within which there is fixed a rod 192. A pin 193 passing through the lower end of the rod 192 works in a slot 194 in a block 195. A spring 196 around rod 192 normally presses the block 195 downward.

Centrally of each burner guide frame, there is a guide way 197 for a slide 198. A cam roller 199 at the lower end of slide 198 rests upon a cam 200. A spring 201 connected to slide 198 and base plate 20 holds the slide against the cam or to the limit of its downward movement.

A cross-head 202 is mounted on the upper end of slide 198. Each bell crank lever 179 has a projection 203 which projects in the pathway of cross-head 202, so that when slide 198 is at the lower limit of its movement, cross-head 202 rests upon these projections 203.

Guide rods 204 project downward from the burner guide frames and are surrounded by slides 205. There is a group of five burners at each end of the apparatus, three burners in one row and two in another. Beneath the two burners there is a cross-head 206 carried by a slide 205, while beneath the three burners there is another cross-head 206 carried by two slides 205. Cross-heads 206 carry arms 206', one for each burner, each arm 206' carrying a vertical pin 207. Surrounding the upper end of each pin 207 is a sleeve 208 projecting through the burner carrier in alignment with the axis of the respective burner. The upper end of the sleeve is filled by a block 209, and a spring 210, between block 209 and the upper end of rod 207, tends to raise the sleeve to the upper limit of its travel, said limit being set by a pin 211 fastened through the sleeve sliding in a slot 212 in the rod 207. Slide 198 has a lower cross-head 213, and for each cross-head 206 there is a link 214 pivoted to the cross-head 213 and to a lever 215, the lever 215 being pivoted between lugs 216 on the slide way 197 and connected by a link 217 to cross-head 206.

For each row of burners there is a rock shaft 220 carrying arms 221 having hammers 222 in position beneath the respective blocks 195. From each rock shaft there is a depending arm 223 connected by a link 224 to a cross-head 225. Cross-head 225 has an upwardly projecting sleeve 226 working in a vertical guideway 227. A spring 228 within the sleeve and abutting against the top of the guideway presses the cross-head downward. A cam roller 229 is suitably mounted on the cross-head above a cam plate 230. The cam plate has arcuate slots 231 through which bolts 232 are passed to attach the plate to the wheel carrying cam 102 or 113. The plate 230 has a cam projection 233 in position to contact roller 229 at the proper time.

There is always danger of broken glass interfering with the movements of the various parts, and that is one reason for making the actuation of the various parts yielding in most instances. For the actuation of levers 179, for example, spring-cups 234 are mounted in perforations in cross-head 202, and there is a contact block 235 operable in each spring-cup and adapted to contact the projection 203 of the respective lever 179. The contact block is suspended by a bolt 236 and is normally pressed downward as far as the bolt will permit by a spring 137 surrounding the bolt within the spring-cup.

While the exact structure of the chuck is not claimed in this application, it may be briefly described as follows:

Within each chuck there is a disc 240 adapted to contact the upper end of an article placed in the chuck. From the upper side of the disc there projects a stem 241. A sleeve 242 projects downward within sleeve 42 has its lower end 243 constructed to operate stem 241 under suitable circumstances.

Within each of valve plates 37 and 39, which are constructed in the same manner, there is a passage 244 for withdrawing air from the hollow sleeve and so from the chuck above the article. The connection to the passage 244 is governed by a valve 245 adapted to close upon a valve seat 246. A spring 247 tends normally to raise the valve. The valve stem 248 projects upward through a stuffing box 249 and has a collar 250 movably pinned to its upper end. A spring 251 surrounds the stem between the stuffing box and the collar. A bracket arm 252 projects upward from the valve plate and carries a lever 253 having a contact roller 254 in position to contact the upper end of collar 250. The other end of the lever is pivoted to a vertical slide 255 having a contact block 256 fixed to its lower end.

A fuel pipe 257 leads from any suitable source to an elbow 258 resting over a central opening in plate 57. A vertical pipe 259 extends downward from elbow 258 and is connected at 260 to a pipe 261 carrying burners 262 in position to heat the several chucks.

Beneath the main shaft on the base plate 20, there is a valve casing 263 having an outlet cavity 264 and an inlet cavity 265. A pipe 266 leads into cavity 265 through any suitable connections, not shown, from any suitable source of supply, and other connections, not shown, lead from outlet cavity 264 to the several annular burners. A valve 267 controls the passage between cavities 264 and 265. The valve 267 has an upwardly extending stem 268 to which is attached a sleeve cap 269. A spring 270 normally presses this cap upward, so that a cam roller 271 carried by the cap will contact an actuating cam. Upon the main shaft there is mounted a cam hub 272 carrying a cam flange 273. A cam plate 274 is adjustably mounted on the flange 273 by means of bolts 275. The flange and plate are in position to contact roller 271. By movement of the plate 274 concentrically of the flange 273 the action of the cam may be adjusted.

The apparatus is operated by driving the main shaft in any suitable manner. I prefer to make the two ends of the main shaft independent, so that either end of the apparatus may be stopped and started independently. As shown, there is a drive wheel 280 for each end of the main shaft adapted to be driven by a worm on the shaft of a motor, not shown. The drive wheel 280 is loose upon the shaft. A disc 281 is keyed onto the shaft adjacent the drive wheel. A collar 282 surrounding the shaft has a flange 283 on the opposite side of disc 281 from the drive wheel. Clutch pins 284 are fixed to the flange and normally project through perforations in the disc and drive wheel.

A pin 285 passes through the collar 282, through a slot 286 in the drive shaft, and through a rod 287 adapted to slide within the shaft. An eccentric 288 is pivoted to the end of the rod, and has a socket 289 to which a handle may be fitted. When the eccentric is turned so as to draw out the rod, the collar and flange are moved so as to withdraw pins 284 from the drive wheel and allow the wheel to turn above the shaft.

From the foregoing description and the accompanying drawings the operation of the apparatus will be readily apparent.

The articles are fed to the right side of the machine, as it is shown in Fig. 1, and discharged from the left side. The parts are shown in Figs. 1 to 7, inclusive, in the position which they occupy when the operator begins to fill the holders 91 on charging table 85. The holders on table 86 have been filled, and burned-off articles have been dropped from the chucks onto the holders on discharging table 118.

Tables 86 and 118 are moved to the left, as shown in Fig. 1, or to the right, as shown in Fig. 3, substantially simultaneously. As the discharging table moves from the position shown in Fig. 3 to that shown in Fig. 8, roller 133 is guided by flared ends 136 into groove 135 in slide 134, whereupon roller 141 reaches a depression in cam 142 and allows weight 138 to draw slide 134 downward. This forces downward roller 133 and therewith rack slide 132, and so oscillates rod 119 and turns the holders attached thereto towards the discharging position shown in Fig. 8. Rod 120 is turned at the same time by its connection through rod 145 to rod 119. As the holders approach the horizontal, weight of the burned-off articles 190 overcomes the resistance of springs 128 and 130, allowing the holders to swing downward through the additional distance allowed by pins 126 and slots 125. As the articles slip off and the holders are relieved of the weights of their bottoms, springs 128 and 130 may raise the holders through the arc allowed by slots 125, and thereby give an upward flip to the tops of the departing articles so as to assist in seating the articles upon a subjacent support of any suitable form. If this action of springs 128 and 130 is not desired, weaker springs may be used, so that they will not suffice to raise the holders from a horizontal position, but will be sufficient to bring them to a vertical position after they are raised as far as they will be by the action of cam 142 and the connecting parts.

Cam groove 69 is shaped so that it raises roller 68 and, through the connecting slide 66, link 61, lever 59, and links 58, depresses plate 57 carrying the chucks, as soon as holders 91 of charging table 86 are in alignment with the chucks. The chucks are then raised, lifting the articles out of the holders, whereupon table 86 is moved back to the position shown in Fig. 1, ready to receive another group of articles. Then the chucks are lowered to position the articles within the burners, and the parts at this end of the apparatus will be in the positions occupied by the corresponding parts at the other end of the apparatus, as shown in Figs. 1, 2, 4 and 5.

When the chucks are lowered to place the articles within the burners, teeth 41 of pinions 40 engage teeth 47 on driven sprocket wheels 46, and so the chucks are rotated as long as they are in the lowered position. As will be seen, the articles are held in the burners with the line of severance 291 in position to be impinged by flame from the burners until the glass is melted along the line of severance and the moil 292 drops off. Then the chucks are raised to lift the burned-off articles 291 above the path of the holders on the discharge table, which are moved into receiving position beneath the chucks. Then the chucks are elevated to their highest position, and the lower ends 243 of sleeves 242 actuate stems 241, and the vacuum is broken and the articles knocked loose from the chucks, so that they drop onto the holders, as shown in Fig. 3.

The operative parts connected with the burners are actuated in synchronism with the chucks.

In Figs. 2 and 14 the parts are in the position they assume at the completion of the severance, the glass just beginning to part in the burner at the right while the moil has just dropped in the burner at the left.

The glass is sometimes slightly thicker at one side than at the other, in which case the article is apt to part on one side before it does on the other. Sleeve 208 projecting into the moil prevents it from swinging to one side and so deforming the article.

When severance is completed and the moil drops, it falls on trip paddle 177 and depresses it, thereby breaking the toggle formed by member 179 and link 180 and so allowing the burner carrier to drop until it rests on bearing 173. This is to drop the flame a short distance beneath the severed edge of the article, so that the edge may be smoothed off and fire-finished without melting an excessive amount of glass. The distance the burner is dropped depends upon the position of adjusting screw 182.

When the fire-finishing is completed and just before the chucks are raised, shafts 220 are rocked so as to raise slides 186 and rock jaws 184 from the position in which they are shown in Fig. 12 to that in which they are shown in Fig. 13, so they will grasp the moil and pull it off, if for any reason severance was not quite completed.

After the chucks with the burned-off articles are raised; slide 198 is lowered, drawing down sleeves 208 through the action of lever 215, links 214 and 217 and other connecting parts. This allows the moil to slide off of the trip paddle. Upper cross-head 202 contacts projections 203 on members 179 and so raises paddles 177 and straightens or resets the toggles formed by members 179 and links 180. Slide 198 is then returned to the position shown in Fig. 14, raising sleeves 208 and lifting cross-head 202 above projections 203, so as to allow the tripping action of paddle 177 during the next burning-off operation.

As will be readily apparent from the above description, the apparatus at the two ends of the machine work in succession, so that an operator may load one of the charging tables and then, while the mechanism is automatically taking the articles from this charging table, burning them off, and delivering them from the other side of the machine, the operator may load the other charging table. Furthermore, the inward movement of a charging table, the removal of the articles therefrom by the chucks, and the return of the table to receiving position occupies less time than the lowering of the chucks, burning-off and fire-finishing of the articles, raising of the chucks, movement of the discharging table into receiving position, and discharge of the articles onto the holders of the discharging table. Therefore, both charging tables are in receiving position during a part of the time and consequently the operator does not have to load each table during exactly half the time with machine-like precision.

In connection with the description of the operative parts connected with the burner, attention was called to the yielding nature of the various operations, in order that any piece of broken glass accidentally lodging in the path of a moving part may not result in breaking the machine. This is true of the operation of the carrier tables and chucks as well. The charging tables are moved in one direction by springs 103 and 114, while the cams move then in the other direction through interposed springs 105 and 116, while the discharging tables are moved in one direction by springs 163 and the cams move them in the other direction through interposed springs 158.

The movement of chuck carrying plate 57 is positive, but the chucks are carried by means of flanges on pinions 40 resting on the plate, so that if a chuck encountered an obstacle it would merely rest thereon and allow the continued downward movement of plate 57 about its sleeve 42.

I have shown in some detail a working embodiment of my invention, but it will be understood that numerous changes may be made within the scope of the appended claims without departing from the spirit of my invention.

I claim:

1. In glass working apparatus, a vertically reciprocable chuck, a horizontally movable charging table having an article holder, and automatic means to reciprocate the table and thereby move the holder between a position in alignment with the chuck and a position at one side thereof.

2. In glass working apparatus, a rotatable chuck, an article holder, automatic means to reciprocate the holder between a position in line with the chuck and a position at one side thereof, and automatic means to reciprocate the chuck to and from the holder while the holder is in alignment therewith.

3. In glass working apparatus, a rotatable chuck, an article holder, automatic means to reciprocate the holder between a position in line with the chuck and a position at one side thereof, automatic means to eject an article from the chuck onto the holder when the holder is in alignment with the chuck, and automatic means for discharging the article from the holder when the holder is at one side of the chuck.

4. In glass working apparatus, a chuck rotatable about a vertical axis, an article holder, automatic means to reciprocate the holder horizontally between a position beneath the chuck and a position at one side thereof, and means to reciprocate the chuck towards and from the holder while the holder is in line with the chuck.

5. In glass working apparatus, a chuck rotatable about a vertical axis, an article holder, automatic means to reciprocate the holder between a position beneath the chuck and a position at one side thereof, and operative means for the chuck causing it to drop an article upon the article holder while it is in line with the chuck.

6. In glass working apparatus, a chuck rotatable about a vertical axis, a charging article holder, means to reciprocate the holder from a receiving position at one side of the chuck to a position in line with the chuck, a discharging article holder, means to reciprocate the discharging holder from a receiving position in line with the chuck to a discharging position at one side thereof, and means to reciprocate the chuck and cause it to take an article from the charging holder when the charging holder is in line therewith and to discharge the article upon the discharging holder when the discharging holder is in line therewith.

7. In combination, a chuck, a burner, and an article carrier reciprocable to and from a position between the burner and the chuck.

8. In combination, a chuck, a burner, a charging article carrier reciprocable between a position at one side of the chuck and a position between the chuck and the burner, and a discharging article carrier reciprocable between a position at the other side of the chuck and a position between the chuck and the burner.

9. In glass working apparatus, a rotatable chuck, a charging article carrier reciprocable between a position at one side of the chuck and a position in line therewith, and a discharging article carrier reciprocable between a position at the other side of the chuck and a position in line therewith.

10. In apparatus for burning-off glassware, a burner, a charging carrier adapted to receive an article at one side of the burner and deliver it in alignment therewith, and a discharging carrier adapted to receive the article in alignment with the burner and discharge it at the other side thereof.

11. An apparatus for burning-off glassware, a plurality of chucks divided into two groups, two charging tables reciprocable between receiving positions and positions in line with the respective groups of chucks, and means for moving the tables alternately, whereby when one table is in line with one group of chucks the other table is in receiving position.

12. In apparatus for burning-off glassware, a plurality of chucks divided into two groups, two discharging tables reciprocable between receiving positions in line with the respective groups of chucks and discharging positions at one side of said chucks, and means for moving the tables alternately, whereby when one table is in line with one group of chucks the other table is in discharging position.

13. In apparatus for burning-off glassware, a plurality of burning-off devices divided into two groups, two charging tables, means to reciprocate the tables alternately between receiving positions at one side of the said devices and positions in line with the respective groups of devices, two discharging tables, and means to reciprocate the discharging tables alternately between positions in line with the respective groups of said devices and discharging positions on the other side of said devices from the charging positions.

14. In glass working apparatus, a chuck, an article holder movable between a position in alignment with the chuck and a position at one side thereof, and means to tilt the article holder when in its position at one side of the chuck to discharge an article held thereby.

15. In combination, a chuck adapted to hold a hollow glass article mouth downward, an article carrier having a holder adapted to receive the article thereover, means to move the carrier from a position with the holder beneath the chuck to a position at one side thereof, and means to tilt the holder and discharge the article therefrom when at one side of the chuck.

16. In a glass discharging device, a holder adapted to receive a hollow glass article thereover mouth downward, mechanical means to tilt the holder and carry the article towards a horizontal position, a lost motion connection between the holder and said means and a spring tending to draw the holder towards a vertical position to the limit of its lost motion connection, the spring being adapted to have the weight of the article overcome it when the holder approaches the horizontal and so move the holder to the other limit of its lost motion connection.

17. In a glass discharging device, a holder adapted to receive a hollow glass article thereover mouth downward, mechanical means to tilt the holder and carry the article towards a horizontal position, a lost motion connection between the holder and said means and a spring tending to draw the holder towards a vertical position to the limit of its lost motion connection, the spring being strong enough to support the weight of the holder even when it is in a horizontal position, but not strong enough to support the holder and the full weight of the article thereon when it is in a horizontal position.

18. In a glass discharging device, a holder adapted to receive a hollow glass article thereover mouth downward, and automatic means to tilt the holder until the article starts to slide off and then to move the outer end of the holder upward so as to raise the mouth of the article and discharge it mouth up.

19. In a glass discharging device, a holder adapted to receive a hollow glass article thereover mouth downward, automatic means to tilt the holder until the article starts to slide off, and yielding means adapted to raise the outer end of the holder as soon as it is relieved of a portion of the weight of the article, whereby the article is delivered mouth up.

20. In apparatus for burning-off glassware, charging holders adapted to receive hollow glass articles, burning-off burners, chucks, mechanism for operating the chucks to take the articles from the charging holders and hold them moil down in operative relation to the burning-off burners, and means to receive the burned-off articles mouth down from the chucks and deliver them from the apparatus mouth up.

21. In apparatus for burning off glassware, a plurality of annular burners, a plurality of chucks movable simultaneously to position articles in operative relation to the respective burners, separate means to lower each burner when the severance is completed by that burner, and means to raise the burners to their original positions simultaneously.

22. In combination, a plurality of burners adapted to burn moil off of glassware, a trip apparatus beneath each burner adapted to lower the respective burner when the trip is actuated by the falling moil, and common means for simultaneously re-setting the trip apparatus of the burners.

23. In combination, a plurality of burners adapted to burn moil off of glassware, a toggle supporting each burner, a trip beneath each burner and adapted to break the toggle when contacted by falling moil, and common means for straightening the toggles and re-setting the trips.

24. In combination, a vertically reciprocable chuck for glassware, a charging table, and means to reciprocate the table between a position beneath the chuck and a position at one side thereof, said reciprocating means being yielding in both directions.

25. In combination, a charging table, means to reciprocate the table horizontally, a chuck over one extreme position of the table, and means to reciprocate the chuck vertically to take an article of glassware from the table, the table reciprocating means being yielding in both directions.

26. In combination, a charging table, means to reciprocate the table horizontally, a chuck over one extreme position of the table, and means to reciprocate the chuck vertically to take an article of glassware from the table, the downward movement of the chuck being yielding.

27. In combination, a vertically reciprocable chuck for glassware, a discharging table, and means to reciprocate the table between a position beneath the chuck and a discharging position at one side thereof, said reciprocating means being yielding in both directions.

28. In apparatus for burning-off glassware, a burner, a chuck, automatic means to move the chuck towards and away from the burner, jaws, means to close the jaws on the moil of an article held by the chuck in its position nearest the burner, and connections between the chuck moving means and the jaw closing means, whereby the jaws are closed just as the chuck starts to move away from the burner.

29. In apparatus for burning-off glassware, a chuck adapted to hold a hollow glass article, means to reciprocate the chuck vertically, a burner adapted to burn the moil from an article held by the chuck in its lowest position, jaws, means to close the jaws upon the moil of an article in burning off position, and connections between the chuck-reciprocating and jaw-closing means, whereby the jaws are closed immediately before the chuck starts to rise.

30. In apparatus for burning-off glassware, a charging table adapted to receive glass articles at one side of said apparatus, a discharging table adapted to discharge glass articles at the other side of said apparatus, burners, and automatic mechanism for taking glass articles from the charging table, burning the moil off of said articles, and delivering the burned-off articles to the discharging table.

In testimony whereof, I have hereunto signed by name to this specificiation.

ALVAH C. PARKER.